United States Patent [19]

Sibeud et al.

[11] Patent Number: 4,653,272
[45] Date of Patent: Mar. 31, 1987

[54] FLUID ACTUATION DEVICE WITH COMPENSATION FOR WEAR

[75] Inventors: Jean P. Sibeud, Chaponnay; Gérard Ellenberger, Les Charpes, both of France

[73] Assignee: Renault Vehicules Industriels, Lyons, France

[21] Appl. No.: 770,245

[22] Filed: Aug. 28, 1985

[30] Foreign Application Priority Data

Aug. 28, 1984 [FR] France ................................ 84-13279

[51] Int. Cl.<sup>4</sup> ............................................. F16D 13/75
[52] U.S. Cl. ........................................ 60/586; 60/589;
60/593; 91/189 A; 92/6 D; 192/111 A;
188/347
[58] Field of Search ........................ 60/586, 589, 593;
91/173, 189 A, 189 R; 92/6 D, 6 R, 98 D, 99 R,
101; 192/111 R, 111 A, 70.25; 188/153 D, 347,
348

[56] References Cited

U.S. PATENT DOCUMENTS 3,830,061 8/1974 Severinsson ...................... 60/593 X
4,215,625 8/1980 Hoffmann et al. .................. 92/99 X
4,300,351 11/1981 Grüllmeier ....................... 60/593 X

FOREIGN PATENT DOCUMENTS 2124948 11/1972 Fed. Rep. of Germany ... 192/111 A
759540 1/1980 Fed. Rep. of Germany ........ 60/593
2142363 1/1973 France ................................ 60/593
2483022 11/1981 France ................................ 60/593
4116170 11/1968 Japan .............................. 192/111 A Primary Examiner—Robert E. Garrett
Assistant Examiner—Mark A. Williamson
Attorney, Agent, or Firm—Oblon, Fisher, Spivak, McClelland & Maier

[57] ABSTRACT

Fluid actuation device with compensation for wear, particularly for friction clutch mechanisms of the type having a cylinder in which there are placed a first piston resting on a spring and a second piston extended by a declutching control rod, and in which the space between the pistons is filled with an incompressible fluid. The cylinder carries a separation wall between two compartments which house respectively the first and the second pistons. An orifice for communication between said compartments carried by the separation wall is associated with a stopper valve rigidly connected to a membrane that is subjected to a pressure for control and transmission of a thrust force on the cylinder and for driving the control rod.

12 Claims, 6 Drawing Figures

FLUID ACTUATION DEVICE WITH COMPENSATION FOR WEAR

BACKGROUND OF THE INVENTION

1. Field of the Invention

The invention relates to a fluid actuation device with compensation for wear, particularly for friction clutch mechanisms of the type having a cylinder in which there are placed a first piston extended by a declutching control rod and a second piston resting against a spring, and in which the space between the pistons is filled with an incompressible fluid.

2. Related Art

Such a device is known from French Patent No. 2,142,363. There, an effort is made to maintain permanent contact between the control rod and the declutching mechanism by allowing an escape of fluid corresponding to the increase of the travel of the first piston resulting from the wear of the friction linings.

Devices of this type should have a rapid response and use only a minimum of energy for control.

A solution known from French Patent No. 2,003,456 consists of inserting a hydraulic connection with a bellows between the declutching pedal and the declutching mechanism, whose fluid line is connected to a fluid tank that can be adjusted so as to maintain a constant volume of oil in the connection, particulary during the wear of the friction linings and when the device is inoperative.

Devices of this type multiply the pressure sources, which increases their hysteresis, and require increased monitoring for good operation.

SUMMARY OF THE INVENTION

The invention has as its object a device for compensation of wear with automatic operation during the periods of nonuse of the clutch which makes use of a hydraulic adjustment means in which the constituents of the unit formed by the adjustment means, i.e., the cylinder and the pistons, have no relative movements during the operation of the actuation device.

Another object of the invention is a device that makes use of a servomotor with a membrane dividing it into two chambers, one of which constituting a working chamber which receives a fluid under pressure while the other chamber carries a device for varying the working surface of the membrane during the movement of the actuation device to obtain a decreasing declutching control force during the movement of the control mechanism of a clutch release bearing.

A third object of the invention is a device which, with small energy for control and with a rapid response time, makes use of a servomotor with a small course of movement without a correction spring and without any dead volume of the control chamber.

According to the invention, the various objects of the invention are achieved by the fact that the cylinder carries a separation wall between two compartments which house respectively the first and second piston and that a communication orifice between said compartments carried by the wall is associated with a stopper valve rigidly connected to a membrane subjected to a pressure for control and transmission of a thrust force on the cylinder and for driving the piston rod.

The device thus constructed allows, upon the initiation of a hydraulic or pneumatic pressure, quick actuation with a minimum of energy necessary for the production of the force necessary for the movement of the membrane.

The device can include a support part for adapting the useful surface of the membrane to the force for controlling the clutch, performed either under the control of a servomechanism or by a conventional pedal.

Due to the absence of relative movement of the elements of the device during its movements in the direction of the declutching, the overall hysterisis is considerably reduced which facilitates its suitability to various control fluids and servomechanisms.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
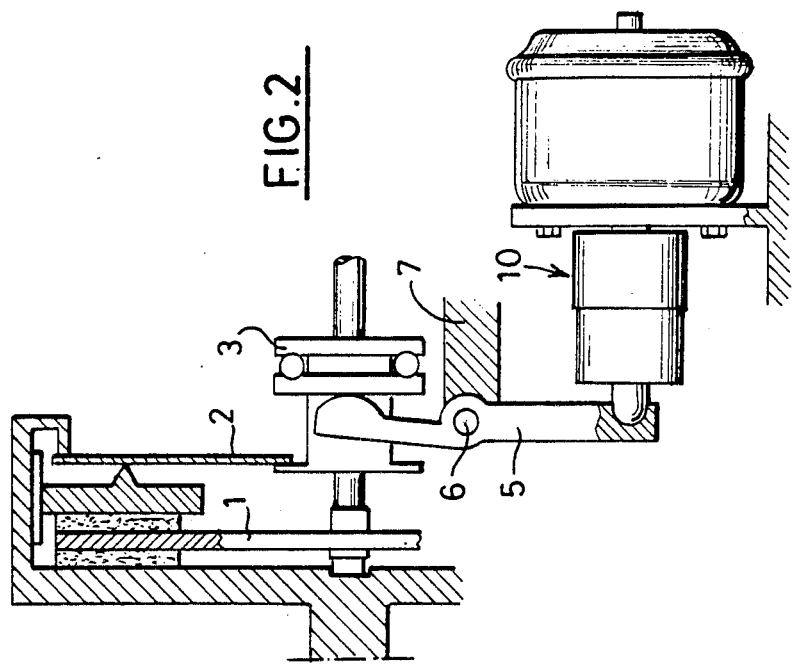
FIGS. 1 and 2 schematically show, in engaged position, a disk clutch respectively having a lever control and actuation fork for a clutch release bearing in which the actuation device acts according to the characteristics of the invention.
Figure 2:
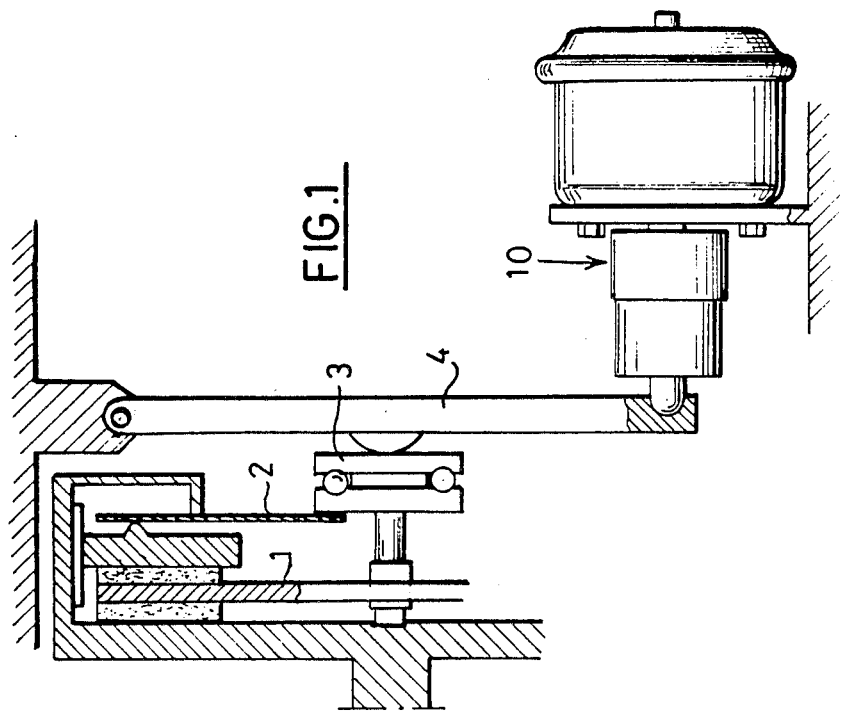

FIGS. 1 and 2 show a disk clutch 1 with control by diaphragm 2 actuated by clutch release bearing 3 mounted to move axially on a clutch shaft under the action of a lever 4 (FIG. 1) or of a fork 5 (FIG. 2) mounted to pivot at 6 on an element 7 of the clutch housing or of the transmission casing. The actuation device with compensation for wear, generally designated by reference 10, acts on the end of lever 4 or of fork 5.

Figure 5:
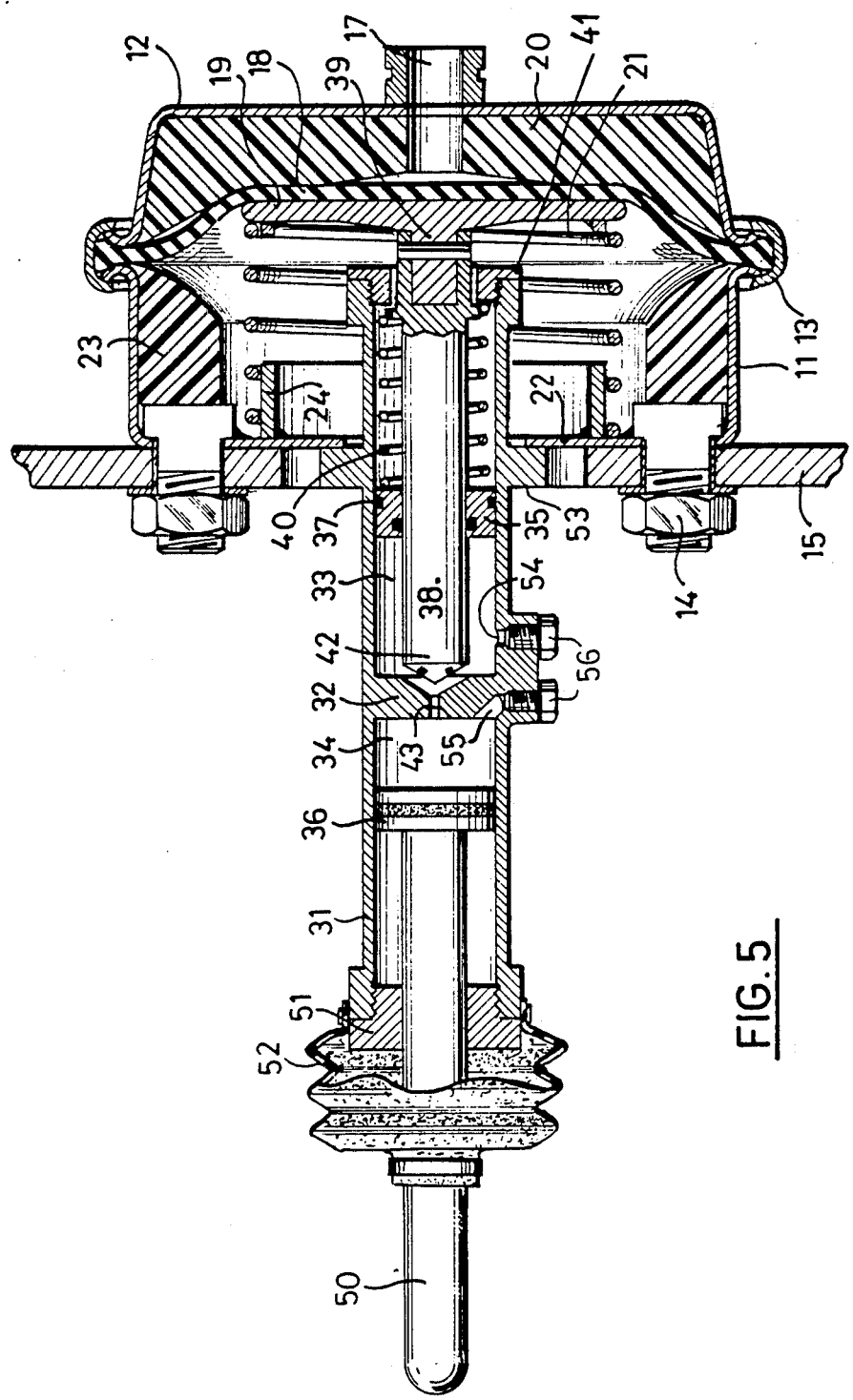
FIG. 5 shows a longitudinal section of the device according to the invention, in the rest state.

The actuation device 10, illustrated more in detail in FIG. 5, is a combination of two units that perform respectively the functions of actuation and of compensation for wear.

The actuation unit consists of a servomotor with a membrane. A casing for the servomotor is formed by two shells 11 and 12 of stamped sheet assembled at their periphery by a detachable clamp 13 or by any other means. Shell 11 is fastened by bolts 14 to a support 15 connected to housing 7 of the transmission or clutch that will be called a "fixed reference plane" in the following description.

Shell 12, acting as a fluid-tight cover, is pierced with an orifice 17 for incoming and outgoing control fluid.

A deformable and inextensible membrane 18 is clamped by its periphery between shells 11 and 12 and receives the pressure of the control fluid. This pressure provides a force for control of the movement of the diaphragm and is transmitted to a cup 19 fixed to membrane 18.

The bottom of shell 12 carries a molded part 20 therein, through which passes orifice 17. The molded part constitutes a stop for membrane 18 and cup 19 in the rest position of the membrane to eliminate a volume that requires filling prior to the transmission of pressure to the membrane.

A spring 21 placed in compression in shell 11 between its bottom 22 and cup 19 constitutes the return means of membrane 19 into contact with molded part 20.

The inner wall of shell 11 carries support 23 which provides the partial support of membrane 18. Support 23 has a special flared shape whose curved convex surface is directed toward membrane 18 to constitute a gradually reducing support of the surface of the membrane that is subjected to the control pressure.

Thus, when the pressure in orifice 17 and shell 12 is constant, the thrust force of the membrane diminishes proportionally to the active surface thereof that is subjected to this pressure, as the movement of the membrane increases. As a result, a decreasing force/movement function suited to each type of clutch is obtained by changing support 23.

A cylindrical sleeve 24 welded to bottom 22 of shell 11 constitutes an end-of-travel stop of cup 19 and thus prevents excessive stresses on the membrane.

To limit the axial deformations of membrane 18 on both sides of its fixation plane (i.e., the junction plane of shells 11 and 12), the end axial support surfaces of the membrane at molded part 20 and at sleeve 24 are equally distant from the fixation plane of the membrane.

The means for compensation of wear consist of a cylinder 31 which carries a separation wall 32 between two compartments 33 and 34. Each compartment constitutes the housing of a piston 35 or 36. Ring-shaped piston 35 is provided with two O-ring or lip seals 37 and is mounted for fluid-tight axial sliding in compartment 33 along a shaft 38 rigidly fastened by a quick-removal pin to a lug 39 carried by cup 19. A spring 40 is mounted in compression between a face of piston 35 which is not subject to pressure, and a stopper plug 41 of compartment 33, the stopper plug constituting a sliding seal between shaft 38 and cylinder 31.

The end of shaft 38 carries a fluid-tight valve 42 intended to plug a small diameter orifice 43 bored in wall 32, which causes compartments 33 and 34 to be connected. Orifice 43 carries a conical seat for the valve 42 which, in turn, carries a fluid-tight seal. The movements of valve 42 and shaft 38 are restricted between two stops respectively consisting of the flared part of orifice 43 that forms the seat of valve 42 or the face of wall 32 that is turned toward this same valve, and of a shoulder of shaft 38 resting on plug 41.

Piston 36 mounted for fluid-tight axial sliding in compartment 34 is axially extended by a declutching control rod 50 which extends through another stopper plug 51 while a protective bellows 52 outside cylinder 31 surrounds control rod 50 and is secured on the body of cylinder 31.

Moreover, cylinder 31 is equipped with an outside flange 53 which constitutes a shoulder defining a stop support on bottom 22 of shell 11 and consequently on the fixed reference plane.

The volume between pistons 35 and 36 is filled with an incompressible fluid which occupies compartments 33 and 34, which are connected to one another by orifice 43.

In addition, two holes 54 and 55 plugged by plugs 56 extend into compartments 33 and 34 and permit the filling or draining of the fluid.

During operation, the hydraulic or pneumatic control fluid, on its arrival in the servomotor, acts on membrane 18 and pushes cup 19. This cup 19 pushes shaft 38 whose valve 42 plugs orifice 43 while exerting a thrust on wall 32. The pressure of the fluid in compartment 34, conditioned by the thrust acting on the section of piston 36, tends to increase. This does not compromise the fluid-tightness at valve 42 of shaft 38 because the surface area of the valve resting on the seat of wall 32 is much smaller than the surface area of piston 36.

Under the thrust of the control fluid and the contact between valve 42 and wall 32, the entire cylinder 31 then moves. The movement of the cylinder 31 drives (via the hydraulic fluid contained in compartment 34), control rod 50 for actuating the clutch mechanism. The return of the cylinder 31 toward shell 12 is aided by the spring 21 via engagement between stopper plug 41 and a shoulder of the shaft 38.

Figure 3:
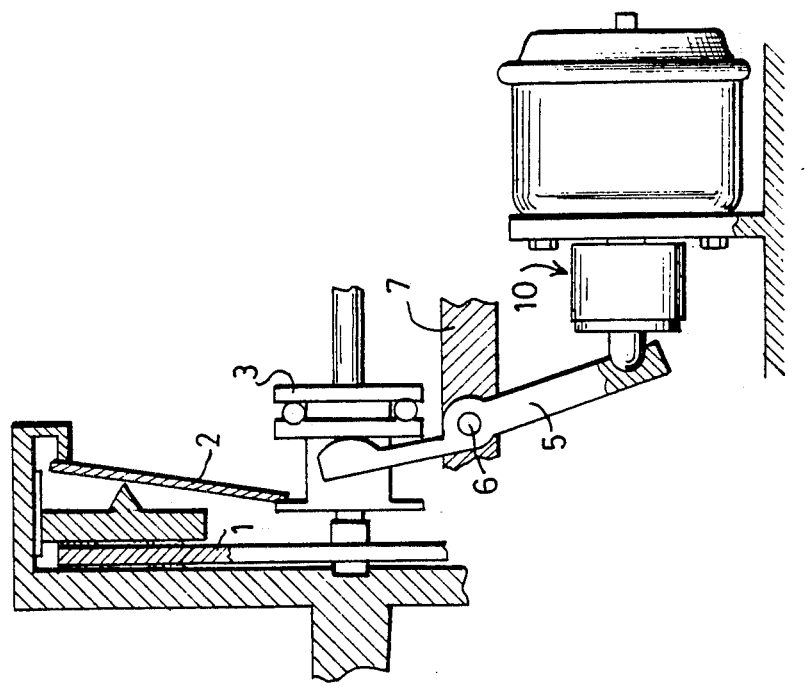
FIGS. 3 and 4 schematically show the clutch following the operation of the wear compensating device.
Figure 4:
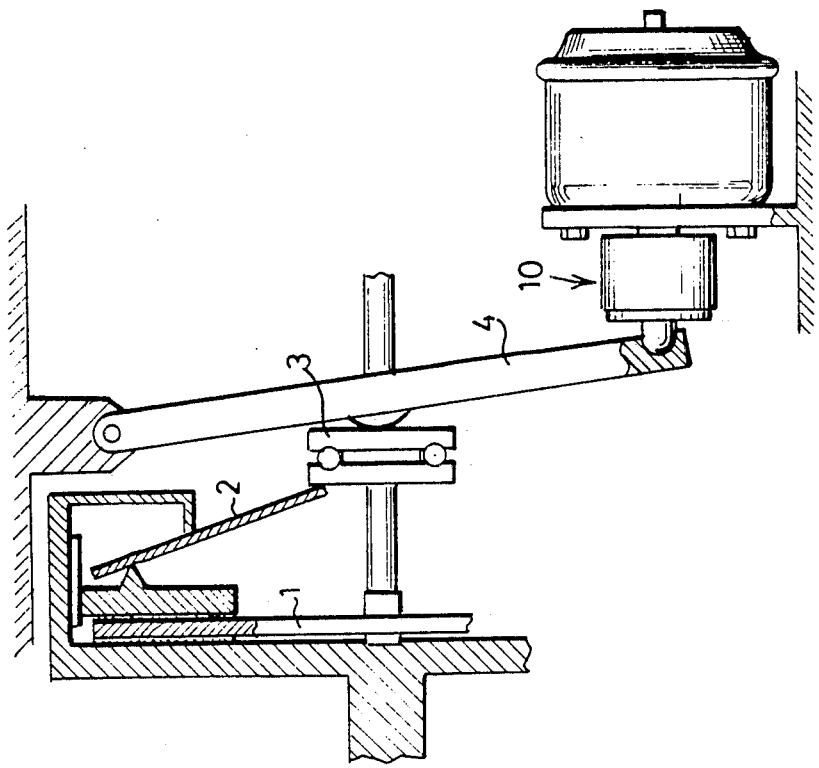

As a result of extensive use of the clutch, the wear of linings tends to change the angular opening of the diaphragm of the clutch to that shown in FIGS. 3 and 4, which is reflected by a thrust on control rod 50 in the direction of reference plane 15. This thrust is transmitted to the fluid of compartment 34 which tends to want to pass through orifice 43 and to push wall 32 and therefore cylinder 31 toward the reference plane all the way to the support of flange 53 on this plane.

Furthermore, spring 21 of the servomotor tends to disengage valve 42 from its seat and thus to open orifice 43.

The fluid of compartment 34, under the indirect thrust of the diaphragm of the clutch and by piston 36, thus passes into compartment 33, pushing back ring piston 35. By so doing, the transfer of fluid between compartments 34 and 33 opposes the force of spring 40 which is selected much lower than that of the clutch diaphragm.

Piston 36 thus progresses, along with the wear of the linings and during the rest phases of the clutch, toward the bottom of compartment 34, gradually taking up the course of wear. Ring piston 35 moves toward plug 41 together with the movement of piston 36.

It should be noted that spring 40 allows the expansion of the fluid contained in compartments 33 and 34 under the effect of heat when the actuator is at rest. It also makes it possible to compensate, without risk of introduction of air, for possible leaks of fluid through the bearings of pistons 35 and 36 so that the volume of the unit of compartments 33 and 34 always remains filled.

Spring 40 also makes it possible to impart an initial hydraulic pressure in compartments 33 and 34 so that, considering the differential useful sections of pistons 35 and 36, an initial stress on control rod 50 is obtained which assures the permanent contact of clutch release bearing 3 with diaphragm 2.

Figure 6:
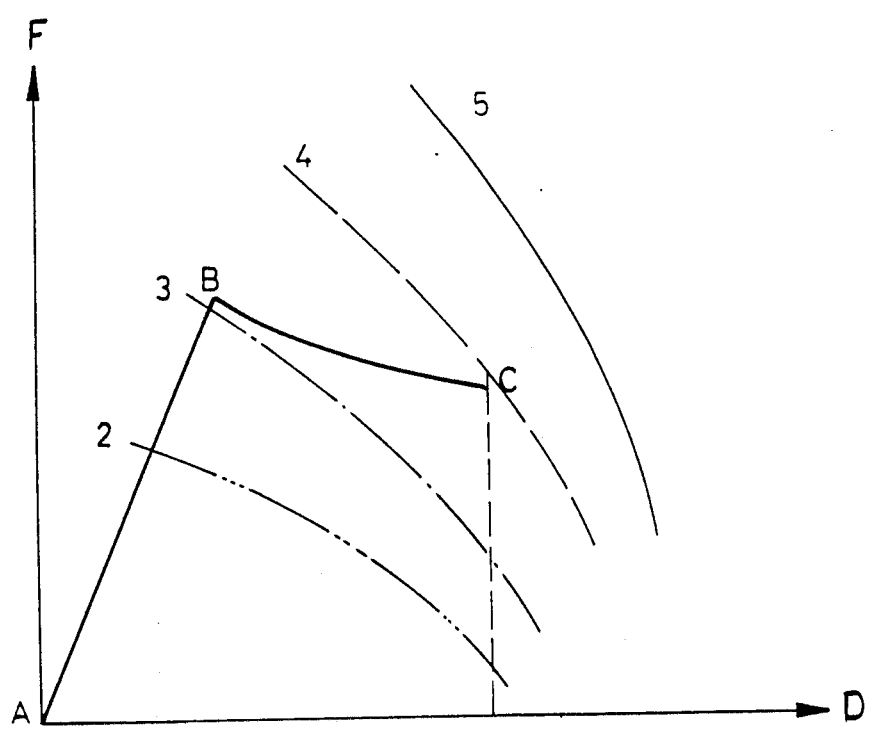
FIG. 6 shows the characteristic operating curve of the device.

The operation of the device is shown in the graph of FIG. 6 in which the control force F received on control rod 50 increases at the beginning of a declutching stroke D along portion AB and decreases from the operating point B on isobar curve 3, which corresponds to the control pressure along line BC to point C, which covers the total distance of disengaging travel measured on rod 50.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid actuation device with compensation for wear, comprising:
   a fixed casing;
   a diaphragm fixed in said casing to define first and second chambers therein;
   means for applying fluid pressure to said first chamber for moving said diaphragm,
   a cylinder movable in a direction substantially normal to said diaphragm, said cylinder having a separation wall axially dividing the interior thereof into first and second compartments, said separation wall having an orifice therethrough for communicating said first and second compartments;
   stopper valve means in said first compartment, said stopper valve means being movable with said diaphragm for engaging said separation wall and closing said orifice upon said fluid pressure being applied to said first chamber;
   a first piston movable in said first compartment;
   a second piston fixed to an output control rod and movable in said second compartment;
   an incompressible fluid in said first and second compartments between said first and second pistons; and
   means for biasing said first piston toward said second piston,
   whereby fluid pressure applied to said first chamber moves said diaphragm and stopper valve means to close said orifice and subsequently moves said cylinder and output control rod.

2. The device of claim 1 including:
   means in said second chamber for biasing said diaphragm toward said first chamber for opening said stopper valve means; and
   a first membrane support member in said second chamber.

3. The device of claim 2, wherein said stopper valve means is defined by one end of a shaft having another end fixed relative to said diaphragm, wherein said first piston is slidably mounted on said shaft and has a control area smaller than that of said second piston.

4. The device of claim 3, wherein said first membrane support member is removably mounted in said casing.

5. The device of claim 3, wherein said first membrane support member has a membrane support surface facing said membrane, said membrane support surface being curved such that a control surface of said membrane supported thereby varies as a function of the position of said membrane.

6. The device of claim 1, including means associated with said casing for limiting a maximum deflection of said diaphragm, said maximum deflection being identical for deflections in either direction.

7. The device of claim 2, wherein said first membrane support member is removably mounted in said casing.

8. The device of claim 7 including a second membrane support member in said first chamber, whereby a dead space in said first chamber is minimized.

9. The device of claim 8, wherein said first membrane support member has a membrane support surface facing said membrane, said membrane support surface being curved such that a control surface of said membrane supported thereby varies as a function of the position of said membrane.

10. The device of claim 7, wherein said first membrane support member has a membrane support surface facing said membrane, said membrane support surface being curved such that a control surface of said membrane supported thereby varies as a function of the position of said membrane.

11. The device of claim 2, wherein said first membrane support member has a membrane support surface facing said membrane, said membrane support surface being curved such that a control surface of said membrane supported thereby varies as a function of the position of said membrane.

12. The device of claim 2, including means associated with said casing for limiting a maximum deflection of said diaphragm, said maximum deflection being identical for deflections in either direction.

* * * * *